United States Patent Office 3,495,952
Patented Feb. 17, 1970

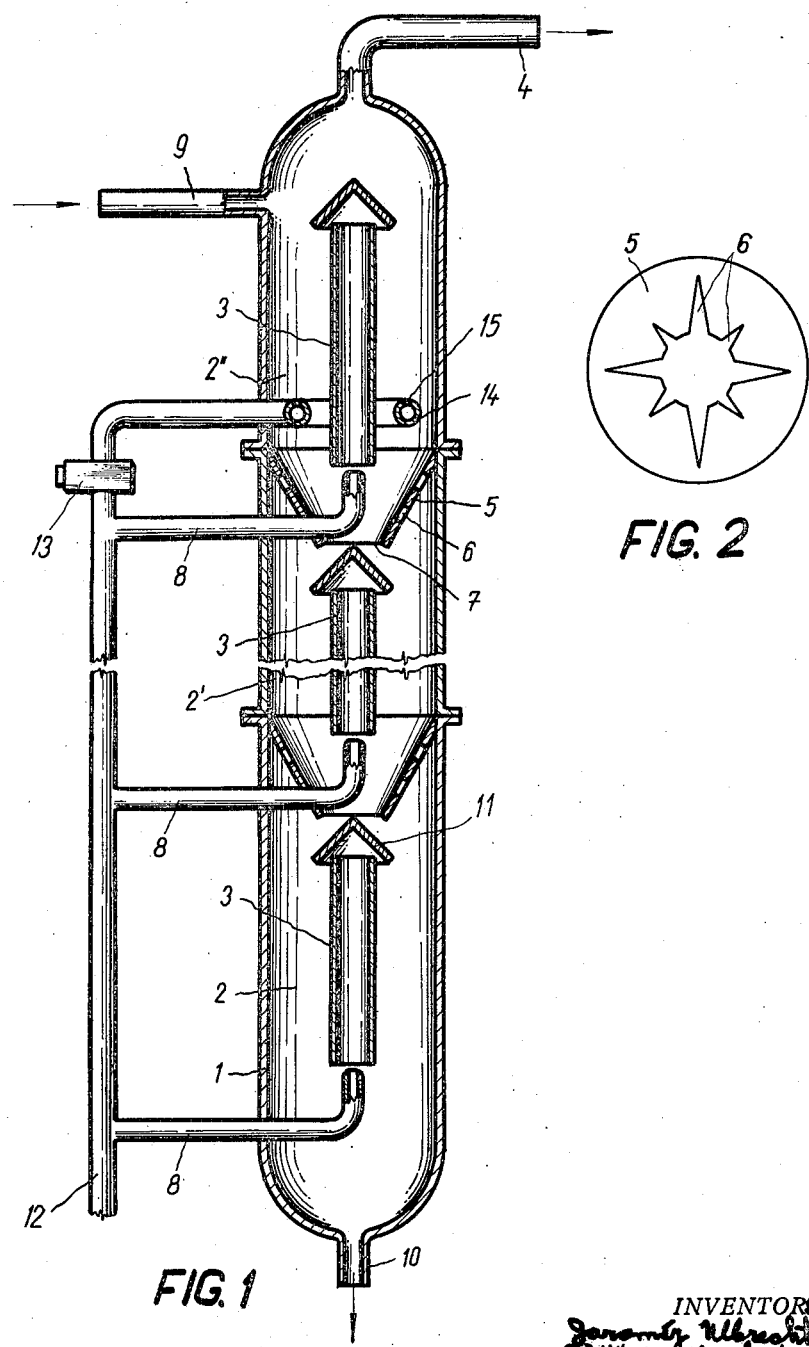

3,495,952
ARRANGEMENTS FOR CONTINUOUS
CONTACTING
Jaromír Ulbrecht and Jiri Nebrěnsky, Prague, and Mirko Kadlec, Lysolaje, Czechoslovakia, assignors to Ceskoslovenska Akademie Ved, Prague, Czechoslovakia
Filed Oct. 4, 1967, Ser. No. 672,836
Claims priority, application Czechoslovakia,
Oct. 5, 1966, 6,362/66
Int. Cl. B01f *3/06, 5/00;* B01i *1/00*
U.S. Cl. 23—285　　　　　　　　　　　　　　6 Claims

ABSTRACT OF THE DISCLOSURE

An arrangement for continuous contacting of a gaseous phase with a solid substance dispersed in a liquid having the shape of a column with the inlet of the suspension of solid substance in the liquid near the top of this column, said column containing a number of chambers, one above the other, each of said chambers provided with a mammoth pump with a gas inlet at the bottom, taking along the suspension dripping from the top, thus causing an intensive whirling motion in each of said chambers and an intimate contact between the gas and the suspension. The individual chambers are separated by partition walls with ports for the passage of the upstreaming gas and of the dripping suspension, with a final gas outlet at the top of the column and an outlet of the treated suspension at its bottom. This arrangement is particularly adapted for suspensions with a higher concentration of the solid substance in the suspension than 10 percent.

BACKGROUND OF INVENTION

Prior art arrangements for continuous contacting of a gaseous phase with a solid substance dispersed in a liquid generally apply a single or double stage process with or without a mechanical mixer. In a known single stage process without a mechanical mixer, the gaseous phase is introduced into a vessel near its bottom by means of a distributor of different design. If however the concentration of the solid substance dispersed in the liquid is higher than a certain value, which may vary within the range of 5 to 10 percent by volume, the gas or vapor passes through the suspension in separate channels, so that no intimate contact between all parts of both phases is established and the mixing is quite inadequate.

Mechanical mixing devices have been therefore applied in order to evenly disperse the particles having a tendency for deposition. If however the mixer has to influence effectively the dispersion of the gaseous phase, it must be a high speed mixer, whereby the gaseous phase must have the opportunity to come in contact with the mixer blades. A rather effective dispersion of the gas is achieved if the gaseous phase is supplied through the hollow shaft and hollow blades of the mixer. This arrangement, however, is difficult to manufacture and difficulties arise also in operation.

The thorough mixing becomes rather difficult if the concentration of the solid phase in the suspension exceeds the value of 12 to 15 percent by volume, whereby the transfer of the momentum to the mixed substance decreases rapidly with increasing distance from the rotation axis of the mixer. This difficulty can be overcome by the application of a low-speed mixer of a diameter slightly less than the diameter of the container. The efficiency of such mixers in providing an intimate contact between the gaseous and liquid phase is however rather low.

Another method of mixing both phases uses the so-called mammoth or gas-lift pump, where a stream of gas is introduced from the bottom into a tube, taking along the suspension by the ejector effect to the top of the tube, dispersing the whole mixture to the space beyond said tube. This method has the advantage of a simple design with no mobile parts.

Prior art multistage devices for this purpose are provided with mechanical mixers at each stage whereby the individual stages are arranged either in cascades or one above the other. In practice where thin suspensions are used a single stage device is quite sufficient. For more concentrated suspensions more stages are required with mechanical mixing in each stage bringing about the following drawbacks:

(1) The column or cascade contains mobile parts, for instance rotating parts requiring sealing, which parts need to be driven and are rather inconvenient in operation.

(2) The individual stages of the column become frequently choked by the solid phase in the concentrated suspension and channels are created in the settled material through which the gaseous phase passes without adequate contact with the suspension.

(3) If a cascade arrangement is used, a pump has to be applied for pumping the suspension.

SUMMARY OF INVENTION

It is an object of this invention to provide an arrangement for continuous contacting of a gaseous phase with a solid substance dispersed in a liquid which would operate satisfactorily also at higher concentrations of the suspension in the liquid, which would be furthermore simple in design, require the minimum of attendance and secure an intimate contact of both phases. The arrangement according to this invention can be particularly used for concentrated suspensions as for instance in organic synthesis in the production of terephthalic acid and the like.

DESCRIPTION OF DRAWING

The accompanying drawing shows an example of an embodiment of the object of this invention whereby FIG. 1 is an elevation of an arrangement in the shape of a column in section. FIG. 2 is a top view upon a partition wall of said column.

DETAILED DESCRIPTION

The column is represented by a closed cylindrical body 1 divided by frusto-conical partition walls 5 into three cylindrical chambers 2, 2' and 2". Each of said chambers 2, 2', 2" contains a mammoth pump, comprising a vertical tube 3 with a conical lid 11 at the top, leaving a free space between the top of the tube 3 and the lid 11 and with a supply tube 8 for the gaseous phase at the bottom of the tube 3. The individual supply tubes 8 of the different stages are connected to the supply mains 12 of the gaseous phase. A supply tubing 9 for the suspension is arranged near the top of the body 1 of the column. The frusto-conical partition walls 5 have a central opening 7 allowing the suspension to drip from one chamber 2, 2', 2" to the other and a number of additional circumferential openings 6 for the upstreaming gaseous phase: a gas outlet 4 is provided at the top of the body 1 and an outlet 10 for the treated suspension at its bottom.

In operation the gaseous phase is supplied via the supply mains 12 by the tubes 8 to the bottom of the vertical tubes 3 taking along the suspension supplied via the supply tubing 9 and dripping subsequently by way of the openings 7 in the partition walls 5 from one chamber into the other. Due to the ejector effect of the gas introduced into the mammoth pumps the suspension dripping down is taken along through the tubes 3, strikes together with the gas stream the lid 11 causing thus an intensive whirling motion and a very intimate contact of both phases. The lids 11 simultaneously prevent the suspension passing down through the openings 7 of the partition walls 5 directly entering the tubes 3. The gaseous phase subsequently escapes through the openings 6 of the partition walls 5 to the next upper chamber and comes finally to the outlet 4. By arranging a number of chambers 2, 2', 2'' in the column one above the other a perfect contact of both phases is established so that the device operates continuously not allowing the suspension to settle in any place.

In FIG. 1 the openings 6 for the gaseous phase are shown as simple holes of the partition walls 5. In the alternative arrangement shown in FIG. 2 these openings 6 are radially extended toward the axis of the body 1 so that they are directly interconnected with the opening 7 for the suspension, offering a star shape single opening.

In some cases it is advantageous to supply at least to one of the chambers 2, 2', 2'' additional gas in order to increase the efficiency of the apparatus. In FIG. 1 such an additional gas supply is indicated to chamber 2'' from the gas supply mains 12 by way of a regulating valve 13 extending into an annular gas distributing element 14 within the chamber 2'' provided with a number of openings 15 through which the gas escapes upwards. Similar additional gas supply elements can be arranged in the remaining chambers 2, 2'.

As an example of an application of the arrangement according to this invention, a device for the processing of sodium benzoate by a gaseous mixture of $CO_2$ and $SO_2$ to benzoic acid is given in the following.

The individual cylindrical chambers 2, 2', 2'' have a diameter of 1000 mm. and the height of 3000 mm. The cylindrical tubes 3 of the mammoth pumps mounted therein have a diameter of 300 mm. and a height of 2500 mm. 12 metric tons of water solution of sodium benzoate in a 20 percent concentration by weight are introduced by way of the supply tubing 9 into the column per hour. Each mammoth pump in the column receives 90 standard cubic meters of a gaseous mixture of $CO_2$ and $SO_2$ in the ratio of 1:1 per hour by way of the supply tube 8. The obtained suspension of benzoic acid having the concentration of about 16 percent by weight is discharged through the outlet 10, the excess gaseous phase of $CO_2$ and $SO_2$ is drawn off through the gas outlet 4 and subsequently recycled.

It is obvious that for different concentrations of the solid substance in the suspension and for different reactions between both phases, the relative dimensions of the individual elements have to be adjusted.

We claim:
1. An arrangement for continuous contacting of a gaseous phase with a solid substance suspended in a liquid comprising a closed column, a plurality of partition walls dividing said column into a plurality of chambers one above the other, a mammoth pump provided in each of said chambers with an inlet at the bottom and an outlet at the top of each mammoth pump, means for supplying the gaseous phase to the bottom inlet of each of said mammoth pumps, a supply tubing near the top of the column for feeding the suspension of said solid substance in the liquid, an outlet for the gaseous phase at the top of the column, an outlet for the treated suspension at the bottom of the column, said partition walls being provided with openings allowing the suspension to pass from an upper chamber to a lower chamber and allowing the gaseous phase to pass in the opposite direction.

2. An arrangement as claimed in claim 1 wherein each partition wall includes a central opening for the flowing suspension and a number of peripheral openings for the upstreaming gaseous phase.

3. An arrangement as claimed in claim 1 with a lid arranged coaxially with and spaced above the top of each of said mammoth pumps (pump), allowing free passage of the gas stream with the entrained suspension through the mammoth pumps, preventing a direct entrance of the down flowing suspension into the pumps from above.

4. An arrangement as claimed in claim 1 with an additional gas supply to at least one of said chambers in the space between the mammoth pumps and the column wall.

5. An arrangement as claimed in claim 2 wherein said central opening of each partition wall is interconnected with said peripheral openings.

6. An arrangement as claimed in claim 5, said central opening and peripheral openings forming a single star shaped opening.

References Cited

UNITED STATES PATENTS

| 243,769 | 7/1881 | Fox | 159—16 XR |
| 2,885,272 | 5/1959 | Kimberlin et al. | 23—284 |

MORRIS O. WOLK, Primary Examiner

D. G. MILLMAN, Assistant Examiner

U.S. Cl. X.R.

23—284; 55—256; 261—108